UNITED STATES PATENT OFFICE.

MARION M. HARRISON, OF AKRON, OHIO.

METHOD OF COLORING RUBBER BALLOONS.

1,239,180.     Specification of Letters Patent.     Patented Sept. 4, 1917.

No Drawing.     Application filed March 7, 1917. Serial No. 153,120.

*To all whom it may concern:*

Be it known that I, MARION M. HARRISON, a citizen of the United States, and resident of Akron, Ohio, have invented certain new and useful Improvements in Methods of Coloring Rubber Balloons, of which the following is a specification.

My present invention relates to improvements in the art of producing articles of vulcanizable plastics of various colors.

In the following specification I have described my invention as embodied in the production of toy balloons which have generally been made by dipping a form successively in a solution of rubber dissolved in a suitable solvent until a coating of sufficient thickness is provided on the form, and thereafter vulcanizing the article, though it will be understood that my invention is not limited to this specific article or material.

In the manufacture of these articles it has heretofore been the practice to pursue one of two methods of coloring the articles.

The first was to form the balloon or other article of a transparent or natural colored gum, and thereafter strip it from the form, and color it, either by boiling for a suitable length of time in an aqueous anilin dye solution, or by agitating it in an organic solvent containing a suitable coloring matter.

The second method was to form the article from a rubber or gum solution colored with a suitable pigment to provide the article of the desired color.

The first of these methods is objectionable, in that the coloring matter is distributed over the inner surface of the balloon as well as the outer, and hence, is wasteful of color. Furthermore, while I have found it possible to remove the excess coloring matter from the outside surface, as yet no practicable method has been devised for cleansing the inner surface of the neck of the balloon well enough to prevent a considerable extraction of color when subjected to the action of saliva and the rubbing action of the lips of a child.

The second method while producing an article in which the color is distributed through the stock and will not come off, is objectionable in requiring a large outlay of money to keep in stock and provide room for a large number of vats of different colored gums or cements, a separate vat being required for each color.

It is further difficult to secure the requisite coloring materials to mix with the gum solution to produce the different shades desired.

My present invention aims to avoid the objections of both of these methods, and the invention includes the novel method hereinafter described and defined by the appended claims.

In proceeding according to my invention I form or shape the article in a suitable manner from uncolored or white gum and in the case of toy balloons I form them in the customary manner by dipping the forms in the gum solution, a sufficient number of times to secure the desired thickness of material which is dried after each immersion.

After the form has been dipped into a rubber solution until the article has attained the required thickness, the rubber is then dried on the form and afterward cured by immersion in a cold solution of sulfur chlorid, in a solvent of rubber. The article is thereafter again dried on the form so as to evaporate any remaining sulfur chlorid which would have an injurious effect upon the coloring matter. The forms carrying the articles are then dipped into the coloring solution, which consists of an anilin dye dissolved in a rubber solvent. The rubber solvent of the solution penetrates the gum of the article carrying the coloring matter into and distributing it through the material of said article. The articles are then dried for a third time and any dye remaining on the surface may be removed by washing with a suitable solvent or tumbling the articles in drums containing moist rags.

Another advantage of my invention is that it enables me to use a cold dye solution.

I have found that excellent effects may be secured by using as a coloring matter an anilin dye in benzol, carbon bisulfid, or carbon tetrachlorid, all of which readily penetrate the gum.

Another advantage of my invention is that in the manufacture of toy balloons I can readily manipulate the forms so as to coat only the spherical portion, leaving the neck uncolored.

Having thus described my invention what I claim is:—

1. The hereindescribed method of coloring rubber balloons and the like which consists in dipping them while on their forms in a solution of an anilin coloring matter in a solvent of rubber.

2. The hereindescribed method of coloring rubber balloons and the like which consists in dipping them while on their forms but after vulcanization in an anilin coloring matter dissolved in a solvent of rubber.

In testimony whereof, I affix my signature.

MARION M. HARRISON.